United States Patent Office 3,122,414
Patented Feb. 25, 1964

3,122,414
PROCESS FOR RECOVERY OF STRONTIUM VALUES FROM FISSION PRODUCT WASTE SOLUTIONS
Donald E. Horner, Clinton, and Russell P. Wischow, Knoxville, Tenn., assignors to the United States of America as represented by the United States Atomic Energy Commission
No Drawing. Filed Oct. 19, 1960, Ser. No. 63,703
3 Claims. (Cl. 23—102)

Our invention relates to processes for the separation and recovery of fission products from aqueous solution and more particularly to a process for the recovery of strontium values.

Strontium 90, a long-lived radioactive fission product, presents several advantages in radiation-source applications. Because of the characteristic radiation emitted (0.61 mev. beta, no gamma), this isotope is suitable for use in medicine and industry for such applications as beta-ray therapy and thickness gauging. Its long half-life (28 years) and chemical stability in the form of compounds such as strontium titanate make strontium 90 particularly attractive as a source of thermo-electric power for remote communication outposts and weather stations. These applications require large quantities of strontium 90 with a high specific activity and a high degree of chemical and radiochemical purity.

The usual source of strontium 90 is an aqueous solution obtained in the chemical reprocessing of decayed, irradiated nuclear reactor fuel elements. Chemical reprocessing is generally effected by dissolving the fuel elements in an acidic solution and extracting uranium and plutonium values into an organic solvent such as tributyl phosphate in a hydrocarbon diluent. The bulk of the fission products, including strontium, and various extraneous impurities are left in the remaining aqueous waste solution in these processes. The composition of fission-product solutions obtained in these processes may vary considerably, depending on the type of fuel involved and the process conditions employed. The composition of a typical fission-product solution obtained in the processing of irradiated aluminum-clad natural uranium metallic fuel elements is as follows:

| Constituent | Concentration, M | Concentration, g./l. |
|---|---|---|
| $HNO_3$ | 4.0–6.0 | |
| $Fe^{+3}$ | 0.5 | |
| $Na^+$ | 0.5–0.6 | |
| $Al^{+3}$ | 0.1 | |
| $Cr^{+3}$ | 0.01 | |
| $Ni^{+2}$ | 0.005–0.01 | |
| $UO_2^{++}$ | 0.002–0.01 | |
| $SO^=$ | 0.75–1.0 | |
| $PO_4^{-3}$ | 0.01 (as ppt.) | |
| $Si$ | 0.02–0.2 (as ppt.) | |
| $Ce$ | | 0.47 |
| $Zr$—$Nb$ | | 0.60 (as ppt.) |
| $Ru$ | | 0.29 |
| $Cs$ | | 0.37 |
| $Rare Earths$ | | 0.83 |
| $Sr$ | | 0.17 |
| $Y$ | | 0.08 |
| $Pu$ | | 0.0035 |

It may be seen that large amounts of ionic contaminants such as iron, sulfate and sodium are contained in proportion to the low concentration of strontium.

Various processes have been employed for the separation and recovery of strontium 90 from solutions of this type, but none has proven practical for economical recovery of large quantities of this activity. Scavenger precipitation, e.g., with a ferric hydroxide precipitate, has been attempted, but other activities are also preciptated by this means and the resulting bulky volumes of precipitated material are difficult to handle. Solvent extraction with theonyl trifluoro acetone has also been employed, but this process is impractical because of excessive costs. It has also been found that strontium may be extracted from a pure aqueous solution with a solution of di(2-ethylhexyl) phosphoric acid in a hydrocarbon diluent. This method, however, is ineffective for waste solutions containing appreciable amounts of iron, which is normally present as a result of corrosion of ferrous-metal equipment by the process solution. At the pH required for extraction of strontium the iron is precipitated as ferric hydroxide, carrying a portion of the strontium from solution and interfering with strontium extraction.

In addition to providing for the recovery of strontium from aqueous fission product waste solutions, it is also desired to recover rare earth values from these solutions.

Another object is to provide a process for the recovery of strontium values from aqueous solution containing the same, together with other fission products and iron values.

Another object is to provide an economical process for the recovery of large quantities of strontium from aqueous fission product solution.

Another object is to provide a process for the separate recovery of strontium and rare earth values from aqueous fission product solution.

Other objects and advantages of our invention will be apparent from the following detailed description and claims appended hereto.

In accordance with our invention strontium values are extracted from an aqueous solution containing the same, together with other fission products, extraneous impurities and iron values, by providing sufficient tartrate ions in said solution to complex the iron, adjusting the pH of the solution to a value within the range of 4.0 to 6.5 and contacting the solution with an organic solution comprising di(2-ethylhexyl) phosphoric acid in an inert organic diluent. The strontium values are then separated from rare earth values by stripping the combined values into an acidic aqueous solution and extracting the rare earths into a similar organic phase at a pH of 0.5 to 3.0, the strontium remaining in the aqueous phase at this pH. Further extraction cycles may then be employed to obtain a purified strontium concentrate. This process provides an effective and economical means for large-scale recovery of strontium from fission product waste solutions.

We have found that the problem of iron interference with di(2-ethylhexyl) phosphoric acid extraction is overcome by complexing the iron with tartrate ions. Other complexing agents such as thiocyanate and salicylate are ineffective because of instability in the acidic radioactive waste solution medium, and iron tends to be excessively extracted into the organic phase along with the strontium. Information available in the published literature ("Chemistry of Chelate Compounds," by Martell and Calvin at page 544, 1952), indicated that strontium as well as iron would be strongly complexed by tartrates and the strontium would thus not be extractable in the presence of tartrates. This conclusion was drawn from the complexation constant for strontium and tartaric acid given in the above-cited reference. We have found, however, that despite the complexing action of tartrates on strontium values the strontium is still sufficiently extractable by the organic solvent in this medium to provide an effective separation process.

Our invention is applicable to aqueous fission product solutions with a wide variety of constituents. The initial acid content of the solution, normally nitric acid, is not critical since the pH of the solution is adjusted by the addition of an alkaline reagent prior to extraction. Metals such as sodium, aluminum, nickel and chromium have no adverse effect on the process. Anions such as sulfates and nitrates may also be in the solution in large quantities without presenting difficulty.

Tartrate ions are provided in the starting solution at a concentration sufficient to complex the iron. A tartrate ion molar concentration at least 1.5 times the iron molar concentration is required to avoid the formation of a precipitate, and 2 times the iron molar concentration is preferred. The distribution coefficient (organic/aqueous) for strontium is decreased with increasing tartrate concentrations, probably as a result of strontium complexing by the tartrate ions. Extraction efficiency is thus lowered by higher tartrate concentrations. Tartrate ions may be conveniently supplied in the form of tartaric acid or a salt such as sodium tartrate.

The pH of the strontium-bearing solution is then adjusted to the value required for extraction of strontium. A pH value within the range of 4.0 to 6.5 may be employed, and a value of approximately 5.5 is preferred. Adjustment of pH may be readily effected by the addition of an alkaline reagent to the solution. Although not critical, an alkali metal hydroxide such as sodium hydroxide is preferred.

The organic phase employed in the process of our invention may comprise a solution of di(2-ethylhexyl) phosphoric acid in an inert organic diluent. In the use of this extractant, however, acid hydrogen ions in the organic phase tend to exchange with sodium ions in the aqueous phase, with a resulting change of pH in the system. It is accordingly preferred to use a mixture of di(2-ethylhexyl) phosphoric acid and sodium di(2-ethylhexyl) phosphate in the organic phase in order to stabilize the pH. The use of the sodium salt requires the further addition of a solubilizing agent to present the formation of a third phase. Tributyl phosphate and long chain alcohols such as 2 ethyl hexanol and tridecanol may be employed for this purpose. Although the relative proportions of these constituents may be varied within the scope of our invention, an extractant mixture comprising 70 mole percent of the acid form and 30 mole percent sodium salt is preferred, with the solubilizing agent such as tributyl phosphate being provided at a molar concentration equivalent to approximately one-half the total extractant concentration. The concentration of the combined extractants in the organic diluent is likewise not critical, and any suitable concentration such as 0.3 molar may be employed. In view of their chemical inertness and desirable physical properties mixtures of hydrocarbons such as kerosene are preferred as the organic diluent. An example of a suitable diluent is a paraffinic solvent containing less than one percent aromatics and boiling in the range of 345° F. to 400° F., said solvent being commercially available under the trade name "Amsco 125–82."

After addition of tartrate ions and pH adjustment as described above the aqueous feed solution is contacted with the organic phase to extract the strontium and rare earth values. Although not critical, it is preferred to employ an organic to aqueous flow ratio of 2 to 1 in the extraction step. Strontium is rapidly extracted into the organic phase, a contact time of only approximately one minute being required to reach equilibrium. Since prolonged contact time may result in partial extraction of iron into the organic phase, the minimum effective contact time is preferred. Longer contact times such as 30 minutes normally required in large-scale extraction columns may be employed without significant difficulty from iron extraction.

Approximately 99 percent of the strontium, along with 95 percent of the rare earths and minor amounts of the other fission products and iron, are extracted into the organic phase. These values are then stripped into aqueous solution by contacting the organic phase with an aqueous nitric acid solution. Most of the extracted iron remains in the organic phase in this step. Although not critical, it is preferred to employ a 2 molar nitric acid strip solution and to contact the two phases at an organic to aqueous flow ratio of 5 to 1.

Separation of strontium from rare earths is then effected by adjusting the pH of the strip solution to a value within the range of 0.5 to 3.0, with a pH of 2 being preferred, by the addition of an alkaline reagent and contacting the solution with an organic phase, preferably of the same composition employed in the initial extraction step. The rare earths are extracted into the organic phase while strontium remains in the aqueous phase at this pH. In order to complex the remaining traces of iron it is preferred to provide a small amount of tartrate ions in the aqueous phase. About 0.005 M tartrate is suitable for this purpose. The extraction of rare earths is preferably carried out at an organic to aqueous flow ratio of 1 to 6. Rare earth values may then be stripped from the organic phase with an aqueous nitric acid solution. Separation and recovery of individual rare earth values may be effected by known ion-exchange techniques.

The strontium-bearing aqueous solution may be further purified and concentrated by repeated cycles of extraction and stripping in the same manner employed in the initial extraction step. The strontium-bearing solution is adjusted to the 4.0 to 6.5 pH value required for strontium extraction and contacted with the same organic phase initially employed. Stripping is effected by contacting the organic phase with a 2 molar nitric acid solution in the manner previously described.

Suitable concentration and purification of the strontium may be obtained by utilizing a four-cycle process comprising an initial extraction cycle, a rare-earth partitioning cycle and two further strontium extraction and stripping cycles. Under typical conditions a strontium/rare earth separation factor of approximately 2500 is obtained with this process. Strontium is concentrated by an overall factor of 70 and separated from sodium by a factor of 400. Typical fourth cycle product solution contains 12.7 grams strontium per liter, 2.9 grams sodium per liter and 1.4 molar nitric acid. The strontium product solution, which is substantially free of radioactive contaminants, is suitable for further chemical processing by means of which strontium may be obtained in the desired chemical form. E.g., strontium titanate for power source applications may be obtained by precipitation techniques.

Solvent raffinates obtained upon stripping strontium and rare earths from the organic phase may be rendered suitable for recycle by means of a simple treatment. The organic solvent may contain substantial quantities of iron which is extracted initially and is not removed in stripping. The iron may be removed by contacting the solvent with an aqueous solution of sodium carbonate, with a concentration of 0.75 molar being suitable. A small amount of tartrate ions, e.g., 0.075 molar, is also provided in the aqueous solution to complex the remaining traces of iron. Over 99 percent of the iron is removed by means of this treatment. An organic to aqueous flow ratio of 3 to 2 is suitable for this treatment. The treated solvent may then be adjusted to its original composition by the addition of any needed components and recycled to the extraction cycles.

Our invention is not limited to a particular apparatus, and conventional solvent extraction equipment such as mixer-settlers, pulse columns or packed columns may be employed. Column systems are preferred for large-scale operation.

Our invention is further illustrated by the following specific examples:

EXAMPLE I

A synthetic aqueous waste solution was prepared to contain 0.17 grams strontium per liter, 4 M nitric acid, 0.5 M iron, 1 M $SO_4^=$, 0.01 M $Ni^{+2}$, 0.01 M $Cr^{+3}$, 0.1 M $Al^{+3}$ and 0.01 M $UO_2^{++}$. Radioactive strontium 85 was provided to indicate strontium extraction. The aqueous feed was adjusted to a pH of 5.5 by the addition of 5 molar sodium hydroxide solution and to 1 molar tartrate ion by the addition of sodium tartrate. 10 milliliters of aqueous feed was contacted with 20 milliliters of an organic phase comprising 0.15 molar di(2-ethylhexyl) phosphoric acid, 0.15 molar sodium di(2-ethylhexyl) phosphate, 0.15 molar tributyl phosphate in "Amsco 125–82" diluent in a laboratory batch-countercurrent apparatus agitated by a conventional motor driven stirrer. Phase contact time was one minute. The resulting organic phase was separated and contacted with 4 milliliters of a 2 molar aqueous nitric acid strip solution. The strip solution was then subjected to a second extraction step in the same manner as for the first extraction, and the resulting organic phase was again stripped with a nitric acid solution. The distribution of strontium resulting in each extraction and stripping step was followed by measuring strontium 85 activity in the respective solutions. Iron content of the solutions was determined by chemical analysis. Further details and results obtained may be seen by reference to the following table.

*Table I*

EXTRACTION OF STRONTIUM FROM TARTRATE-COMPLEXED SOLUTION

| Stage | Aqueous pH | Strontium 85 Activity (gamma counts per min. per milliliter) | | Strontium Distribution Coefficient (organic/aqueous) | Ferric Iron Concentration (milligrams per milliliter) | | Iron Distribution Coefficient (organic/aqueous) |
|---|---|---|---|---|---|---|---|
| | | Organic | Aqueous | | Organic | Aqueous | |
| 1st Extraction | 4.7 | $3.4 \times 10^4$ | $6.09 \times 10^3$ | 5.15 | 0.20 | 9.5 | 0.021 |
| 2nd Extraction | 4.6 | $3.2 \times 10^3$ | $6.0 \times 10^2$ | 5.33 | 0.087 | 9.0 | 0.0097 |
| Feed | 5.5 | | $6.16 \times 10^4$ | | | 8.7 | |
| 1st Strip | | $6.7 \times 10^2$ | $1.46 \times 10^5$ | $4.6 \times 10^{-3}$ | | 0.014 | |
| 2nd Strip | | 40 | $1.23 \times 10^4$ | $3.2 \times 10^{-3}$ | 0.21 | | |

It may be seen from the above table that over 99 percent of the strontium was extracted from the tartrate-complexed iron-bearing solution in two stages. The low iron distribution coefficients in the extraction stages indicate the effectiveness of tartrate ions in complexing the iron. The strontium product solution contained only 0.014 gram iron per liter, which represents a Sr/Fe separation factor of $1.4 \times 10^3$.

EXAMPLE II

The extraction of strontium from waste solutions containing large amounts of ionic impurities was demonstrated in a continuous pulse-column experiment. A synthetic waste solution was prepared to contain 0.5 M $Fe^{+3}$, 1 M $SO_4^=$, 0.1 M $Al^{+3}$, 4 M $H^+$, 0.01 M $Ni^{+2}$, 0.01 M $Cr^{+3}$, 0.01 M $UO_2^{++}$, and 0.17 gram strontium per liter. The solution was adjusted to 1 molar tartrate ions by the addition of sodium tartrate and the pH was adjusted to 5.9 by the addition of 5 molar NaOH. The final dilution factor resulting from these steps was 3. The organic phase was a solution 0.21 molar in di(2-ethylhexyl) phosphoric acid, 0.09 molar in sodium di(2-ethylhexyl) phosphate and 0.15 molar in tributyl phosphate in "Amsco 125–82" diluent. Extraction was carried out in a ¾ inch diameter column with 33 inches of pulse-plates spaced on 1 inch centers and 9 inches high by 1.75 inches diameter enlarged sections on both the top and bottom of the column. The organic and aqueous phases were continuously introduced into the column at flow rates of 800 and 400 cubic centimeters per hour, respectively. The column was continuously pulsed at 29 cycles per minute with an amplitude of ¼ inch. Under these conditions 1.44 hours were required for each column volume change. After several hours' column operation with non-radioactive strontium, the aqueous feed was altered to contain $1.09 \times 10^5$ strontium 85 gamma counts per milliliter per minute. After ¾ hour's operation with Sr–85 the organic and aqueous streams were sampled and analyzed for Sr–85. Further analyses for Sr–85 were made at 0.5 hour intervals. Iron analyses were obtained on the samples for the 0.75, 2.75 and 5.25 hour intervals. The results obtained may be seen by reference to the following table.

*Table II*

PULSE COLUMN EXTRACTION OF STRONTIUM

| Time Elapsed (hours) | Organic Product | | | | Aqueous Raffinate | | | |
|---|---|---|---|---|---|---|---|---|
| | Sr-85 Gamma counts per ml. per min. | Fe, mg./ml. | Percent Extracted | | Sr-85 Gamma counts per ml. per min. | Fe, mg./ml. | Percent not Extracted | |
| | | | Sr | Fe | | | Sr | Fe |
| 0.75 | $5.0 \times 10^4$ | 0.146 | 91.4 | 3.14 | $4 \times 10^1$ | 9.0 | 0.037 | 97 |
| 1.25 | $5.4 \times 10^4$ | | 98.8 | | $3.7 \times 10^2$ | | 0.338 | |
| 1.75 | $5.4 \times 10^4$ | | 98.8 | | $8.2 \times 10^2$ | | 0.75 | |
| 2.25 | $5.6 \times 10^4$ | | 102.5 | | $1.5 \times 10^3$ | | 1.35 | |
| 2.75 | $5.5 \times 10^4$ | 0.165 | 101.0 | 3.55 | $1.5 \times 10^3$ | 9.1 | 1.37 | 98 |
| 3.25 | $4.4 \times 10^4$ | | 99.5 | | $1.5 \times 10^3$ | | 1.34 | |
| 3.75 | $5.5 \times 10^4$ | | 100.0 | | $1.5 \times 10^3$ | | 1.35 | |
| 4.25 | $5.4 \times 10^4$ | | 99.5 | | $1.4 \times 10^3$ | | 1.31 | |
| 4.75 | $5.4 \times 10^4$ | | 99.5 | | $1.6 \times 10^3$ | | 1.46 | |
| 5.25 | $5.4 \times 10^4$ | 0.153 | 99.5 | 3.29 | $1.5 \times 10^3$ | 8.9 | 1.33 | 96 |

It may be seen from the above table that this system was physically operable, approached a steady state rapidly and did not fluctuate significantly after one column volume throughput.

It is to be understood that the above examples are merely illustrative and are not to be construed as limiting the scope of our invention, which is limited only as indicated in the appended claims. It is also to be understood that numerous variations in apparatus may be employed by one skilled in the art without departing from the scope of our invention.

Having thus described our invention, we claim:

1. In the process for recovering strontium values from an aqueous feed solution containing the same together with iron values, rare earth fission product values and extraneous impurities which comprises contacting said solution at a pH of 4.0 to 6.5 with an initial organic phase selected from the group consisting of a solution of di(2-ethylhexyl) phosphoric acid in an inert organic diluent and a solution of di(2-ethylhexyl) phosphoric acid, sodium di(2-ethylhexyl) phosphate and a solubilizing agent in an inert organic diluent, whereby said strontium values and said rare earth fission product values are extracted into said initial organic phase, separating the resulting strontium-bearing and rare earth fission product-bearing organic phase from the resulting aqueous phase, contacting said resulting organic phase with an aqueous nitric acid solution whereby said strontium values and said rare earth fission product values are stripped from said resulting organic phase, contacting the resulting aqueous strip solution at a pH of 0.5 to 3.0 with said initial organic phase whereby said rare earth fission product values are extracted into said intial organic phase, and separating the resulting purified strontium-containing aqueous phase from the resulting rare earth fission product-containing organic phase, the improvement which comprises providing tartrate ions in said feed solution at a molar concentration at least approximately 1.5 times the molar concentration of iron in said feed solution.

2. The process of claim 1 wherein said tartrate ions are provided at a molar concentration approximately two times the molar concentration of iron in said feed solution.

3. The process of claim 1 wherein tartrate ions are provided in said resulting aqueous strip solution at a concentration of approximately 0.005 molar.

References Cited in the file of this patent

UNITED STATES PATENTS 2,902,454  Moore _____ Sept. 1, 1959

OTHER REFERENCES

Blake et al.: "Proceeding of the Second United Nations International Conference on Peaceful Uses of Atomic Energy," vol. 28, United Nations Publication Sales No. 58 IX 2, vol. 28 (1958), pages 294–297.